United States Patent [19]

LaZonby

[11] Patent Number: 5,494,588
[45] Date of Patent: Feb. 27, 1996

[54] METHOD AND COMPOSITION FOR INHIBITING GROWTH OF MICROORGANISMS INCLUDING PERACETIC ACID AND A SECOND ORGANIC BIOCIDE

[75] Inventor: Judy G. LaZonby, Crystal Lake, Ill.

[73] Assignee: Nalco Chemical Company, Naperville, Ill.

[21] Appl. No.: 350,570

[22] Filed: Dec. 7, 1994

Related U.S. Application Data

[63] Continuation-in-part of Ser. No. 102,286, Aug. 5, 1993, abandoned.

[51] Int. Cl.$^6$ .................................. C02F 1/50; C02F 1/72; C02F 1/76
[52] U.S. Cl. ..................... 210/755; 210/759; 210/764; 210/928; 252/175; 422/35; 422/36; 422/37
[58] Field of Search .................... 210/764, 928, 210/754, 755, 759; 252/175, 180; 422/28, 36, 37, 38

[56] References Cited

U.S. PATENT DOCUMENTS

| | | | |
|---|---|---|---|
| 4,966,775 | 10/1990 | Donofrio et al. | 210/764 |
| 5,306,432 | 4/1994 | Puetz | 210/764 |
| 5,368,749 | 11/1994 | La Zonby | 210/764 |
| 5,395,530 | 3/1995 | Robertson et al. | 210/764 |

*Primary Examiner*—Neil McCarthy
*Attorney, Agent, or Firm*—James J. Drake; Robert A. Miller

[57] ABSTRACT

The present invention provides a composition and method of administering same for inhibiting the growth of microorganisms. The composition of the present invention includes sufficient amounts of a peracetic acid and a second organic biocide. The method of the present invention includes the step of adding sufficient amounts of the peracetic acid and the organic biocide to industrial process waters.

6 Claims, 1 Drawing Sheet

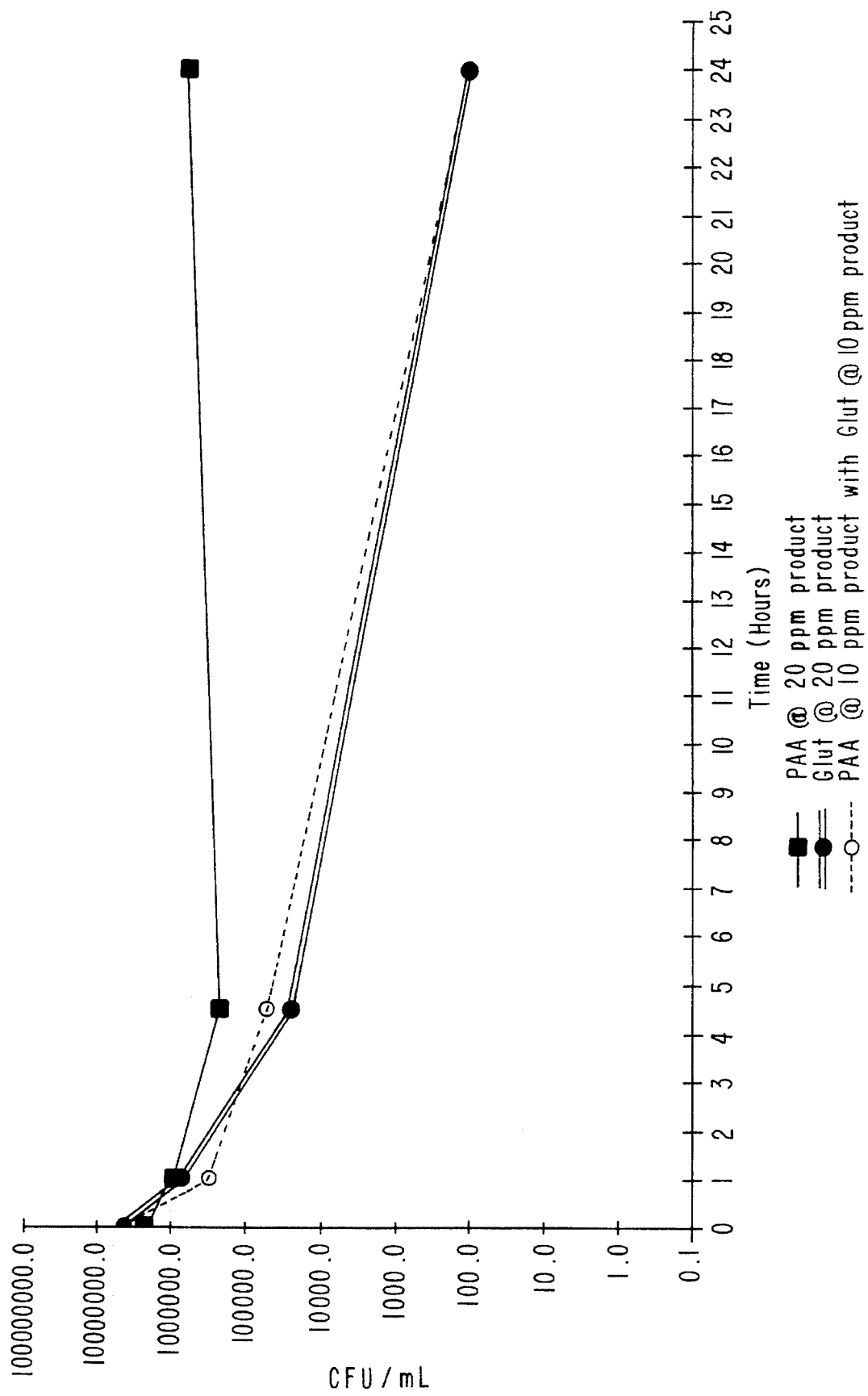

METHOD AND COMPOSITION FOR INHIBITING GROWTH OF MICROORGANISMS INCLUDING PERACETIC ACID AND A SECOND ORGANIC BIOCIDE

The present application is a continuation-in-part of application Ser. No. 08/102,286, filed Aug. 5, 1993, by Judy G. LaZonby, now abandoned, entitled "Method and Composition for Inhibiting Growth of Microorganisms Including Peracetic Acid and a Non-Oxidizing Biocide", the disclosure of which is incorporated herein by reference.

FIELD OF THE INVENTION

The present invention relates generally to controlling the growth of microorganisms. More specifically, the present invention relates to inhibiting the growth of microorganisms in industrial waters.

The presence of microorganisms in waters, especially industrial waters, is a never-ending concern for industrial manufacturers. Examples of industrial waters where microorganisms can interfere with industrial processes include: cooling tower waters; mining process waters; food processing waters; sugar reprocessing waters; and the like.

In the paper industry, the growth of microorganisms in pulp and paper mill waters can adversely affect finished paper products. Microbial life depends on the nutrient supply, the pH and the temperature of a particular system. The warm temperatures and rich carbohydrate containing fluids of paper machines and process streams provide ideal growth conditions for a variety of microorganisms. These contaminating microorganisms are capable of causing spoilage of pulp, furnish, or chemical additives. The microorganisms cause deposits that break loose and fall into the paper furnish, resulting in quality loss and/or end product defects such as holes and spots. The end result is unsalable paper or paper sold at a lower value. Robertson, *The use of phase-contrast microscopy to assess and differentiate the microbial population of a paper mill*. TAPPI Journal, pp. 83 (March 1993).

The presence of microorganisms within industrial water systems results in the formation of deposits of biological origin on industrial machines. These formation deposits give rise to: corrosion; breaks; increased down time; loss of yield; high chemical costs; odors; and expensive deposit control programs. In the paper mill industry, slime deposit is reportedly responsible for nearly 70% of all breaks, blockages and pump failures. Safade, *Tackling the Slime Problem in a PaperMill*, PTI, p. 280 (September 1988).

Slime may be defined as an "accretion or accumulation caused by certain micro-organisms in the presence of pulp fiber, filler, dirt and other materials, mixed in varied proportions, having variable physical characteristics and accumulating at continuous changing rates." Id. In most industrial process waters, especially pulp and paper mill systems, spore forming bacteria and *Pseudomonas aeruginosa* contribute to slime formation. The later is most prevalent in paper mill slimes. Fungi is also a contributor toward slime formation.

The conventional method of controlling microbial growth is through the use of organic biocides. Organic biocides act on the microorganisms in one of three ways: either by attacking the cell wall; the cytoplasmic membrane; or the cellular constituents. Id. at 282.

While biocides do inhibit microbial growth, economic and environmental concerns require improved methods. A problem with the use of biocides is that high levels of expensive chemicals are needed to control microbial growth. To date, none of the commercially available biocides have exhibited a prolonged biocidal effect. Their effectiveness is rapidly reduced as a result of exposure to physical conditions such as temperature or association with ingredients contained by the system toward which they exhibit an affinity. This results in a restriction or elimination of their biocidal effectiveness.

Therefore, the use of such biocides involves continuous or frequent additions to paper mill systems. Further, these additions must be made at a plurality of points or zones in the system. The costs of the biocides and the labor costs involved are considerable.

Moreover, such chemicals are highly toxic in the quantities known to be required for effective control of microbial populations. As a result, environmental regulations restrict the amount of biocides that can safely be discarded into the environment.

Therefore, a need exists for improved :methods for controlling the growth of microorganisms in industrial process waters.

SUMMARY OF THE INVENTION

Pursuant to the present invention, the growth of microorganisms can be inhibited without the use of high levels of certain biocides. The present invention provides compositions to be used for inhibiting the growth of microorganisms in industrial process waters. The compositions include sufficient amounts of a peracetic acid and second organic biocide. The composition of the present invention possesses unexpected synergistic activity against microorganisms, including bacteria and fungi. Peracetic acid is an organic biocide previously only used in the U.S. in the food industry at high concentrations. (0.1–1% product)

The present invention also provides a method for inhibiting the growth of the microorganisms in industrial process waters. The method includes the step of adding to the waters sufficient amounts of a peracetic acid (PAA) and second organic biocide. Combining the peracetic acid with the organic biocide has been found to enhance the effectiveness of the biocide.

In an embodiment, the organic biocide is chosen from the group consisting of: isothiazolin; glutaraldehyde; DBNPA; methylene bisthiocyanate; carbamate; quaternary ammonium compounds; 4,5-dichloro- 1,2-dithio-3-one; and 4,5-dichloro-2-N-octyl-4-isothiazolin-3-one.

In an embodiment, the peracetic acid is added prior to the biocide in the water system. An advantage of the present invention is that it provides improved compositions for use in inhibiting the growth of microorganisms.

Another advantage of the present invention is that it provides an improved method for inhibiting the growth of microorganisms.

Still further, an advantage of the present invention is that it lowers the level of expensive chemicals needed for inhibiting the growth of microorganisms. With the addition of a peracetic acid in the water system, the second organic biocide is effective in low dosages, and as a result is long lasting. The increased effectiveness removes the need for repetitive additions of the biocide at multiple points in the paper making system.

Moreover, an advantage of the present invention is that it provides a more cost effective and environmentally friendly method for treating microorganisms.

Additional features and advantages of the present invention are described in, and will be apparent from, the detailed description of the presently preferred embodiments.

BRIEF DESCRIPTION OF THE DRAWING

The FIGURE in the specification illustrates graphically colony forming units versus hours for microorganisms treated with a composition of the present invention compared to the treatment of peracetic acid or a biocide alone.

DETAILED DESCRIPTION OF THE PREFERRED EMBODIMENTS

The present invention provides, for inhibiting the growth of microorganisms, improved compositions and method of administering the same to a fluid system. The compositions include a sufficient amount of a peracetic acid and a second organic biocide.

The biocide component of this invention includes biocides that exhibit a synergistic effect when added to a fluid stream with a peracetic acid. Examples of suitable organic biocides include: isothiazolin; methylene bisthiocyanate; glutaraldehyde; DBNPA; carbamate; quaternary ammonium compounds; 4,5-dichloro 1,2-dithio-3-one; and 4,5-dichloro-2-N-octyl-4-isothiazolin-3-one. Naturally, mixtures of such biocides can also be used.

The biocides can be obtained from a number of chemical suppliers such as American Cyanamid, Buckman, Betz, Dearborn Chemical, Economics Laboratory, Inc., Merck, Nalco Chemical Company, and Vineland Chemical.

Peracetic acid may also be obtained from a number of chemical suppliers. One such supplier is FMC Corporation of Philadelphia, Pa.

The combination of a peracetic acid along with such organic biocides provides an unexpected synergistic relationship. The synergistic relationship is present in that the cooperative action of the combined peracetic acid with the organic biocides yields a total effect which is greater than the sum of the effects of the biocide or the peracetic acid taken separately.

The optimal amounts of biocide and peracetic acid required for effectiveness in this invention depend on the type of industrial waters being treated. In addition, the concentration of the combined components varies greatly and can depend upon the conditions such as temperature and pH of the waters, and the microbial count. The concentrations may be as little as 1 part per million (ppm) by weight to as much as 250 ppm With respect to the biocide, the lower and upper limits of the required concentration substantially depend upon the specific biocide or combination of biocides used.

Still further, since the suitable biocides that may be used in the present invention are often obtained at different usable concentrations (i.e. activity level), the ratios vary depending on the particular biocide combined with the peracetic acid. For example, the peracetic acid used in the examples below is 5% active, the glutaraldehyde is 50% active, and the DBNPA is 20% active. Thus, a 1:1 ratio of PAA:Glut translates to 1:10 on an actives basis, while a 1:1 ratio of PAA:DBNPA translates to a 1:4 based on actives.

By way of example, and not limitation, the following are biocides, including the percent active of each biocide, that may be used in the present invention: isothiazolin (1.5% a.i.); glutaraldehyde (50% a.i.); methylene biothiocyanate (10% a.i.); DBNPA (20% a.i.); carbamate (30% a.i.); quaternary ammonium compounds (31% a.i.); 4,5-dichloro-1,2-dithio-3-one (5% a.i.); and 4,5-dichloro-2-N-octyl-4-isothiazolin-3-one (2% a.i.), wherein "a.i." represents active ingredient.

Pursuant to the method of the present invention, the growth of microorganisms in industrial process waters can be inhibited. The method comprises the step of adding to the waters the peracetic acid and the second organic biocide of the present invention. In an embodiment, the biocide and the peracetic acid are separate components that are added to the system.

In a preferred embodiment, the peracetic acid is added to the industrial water prior to the addition of the second organic biocide. The peracetic acid can be added pursuant to any known method that provides the desired concentration of the same in the waters.

After the controlled addition of the peracetic acid, the second organic biocide is then added to the water system. In an embodiment, the second organic biocide is added 30 minutes after the peracetic acid is added to the system. Similar to the peracetic acid addition, the biocide can be added pursuant to any known method that provides the desired concentration of the biocide in the waters.

In an embodiment, the method comprises adding approximately 5 to 250 ppm of the organic biocide along with approximately 10 to 250 ppm of the peracetic acid. In an embodiment, the biocide and the peracetic acid are present in a range from about 1 ppm to 1000 ppm of product.

By way of example, and not limitation, examples of the invention will now be given.

EXAMPLES

The following examples illustrate the synergistic relationship obtained with the compositions of the present invention.

Synergy is mathematically demonstrated by the industry accepted method described by S. C. Kull et al. in *Applied Microbiology*, vol. 9, pages 538–541 (1961). As applied to this invention, it is as follows:

$Q_A$=the ppm of active organic biocide alone which produces an endpoint.

$Q_B$=the ppm of active peracetic acid alone which produces an endpoint.

Qa=the ppm of active organic biocide, in combination, which produces an endpoint.

Qb=the ppm of active peracetic acid, in combination with second organic biocide, which produces an endpoint.

$Q_a/Q_A + Q_b/Q_B$=Synergy index if Synergy Index (SI) is:

<1, it indicates synergy 1, it indicates additivity

>1, it indicates antagonism

The following test procedures were utilized during the experimentation of the present invention.

Process water from several papermills was obtained for test purposes. Aliquots of water from each mill were dosed with the indicated concentrations of peracetic acid (5% active obtained from FMC). After 30 minutes of contact time, the designated concentrations of the second organic biocide were added to the aliquots previously dosed with PAA, mixed well and incubated at 37° C. in an orbital shaker. At the designated contact times, each aliquot was sampled to determine the total number of viable organisms in colony forming units per milliliter (CFU/mL) on Tryptone Glucose Extract (TGE) agar. An endpoint of 2,3,4 or 5 $\log_{10}$ reduction in viable organisms was then selected for calculating synergy.

EXAMPLE 1

Synergistic activity of peracetic acid (PAA) and glutaraldehyde (Glut) against microorganisms was demonstrated in mill furnish at pH 7.0.

| Biocide (ppm product) | 30 Min. | 90 Min. | 5 Hours | 24 Hours |
|---|---|---|---|---|
| 1. PAA-10 | $2.3 \times 10^6$ | $4.0 \times 10^6$ | $2.8 \times 10^6$ | $6.4 \times 10^6$ |
| 2. PAA-20 | $5.8 \times 10^5$ | $9.3 \times 10^3$ | $2.3 \times 10^5$ | $6.5 \times 10^5$ |
|  | 0 min. | 60 min. | 4.5 hr. | 24 hr. |
| 3. Glut-50 | $3.2 \times 10^6$ | $3.2 \times 10^4$ | $<10^1$ | $<10^1$ |
| 4. Glut-30 | $3.7 \times 10^6$ | $2.5 \times 10^5$ | $<10^1$ | $<10^1$ |
| 5. Glut-20 | $4.2 \times 10^6$ | $7.2 \times 10^5$ | $2.6 \times 10^4$ | $1.1 \times 10^2$ |
| 6. Glut-10 | $4.4 \times 10^6$ | $2.8 \times 10^6$ | $2.3 \times 10^6$ | $9.5 \times 10^2$ |
| 7. Glut-10/PAA-10 | $4.5 \times 10^6$ | $3.2 \times 10^5$ | $5.3 \times 10^4$ | $1.9 \times 10^2$ |
| 8. Glut-10/PAA-20 | $1.2 \times 10^5$ | $5.3 \times 10^4$ | $2.1 \times 10^4$ | $3.1 \times 10^2$ |
| 9. Control-0 | $2.3 \times 10^6$ | $1.0 \times 10^5$ | $3.3 \times 10^6$ | $5.0 \times 10^6$ |

After 90 minutes of contact, a 2 $\log_{10}$ drop is achieved with:
PAA>20 ppm (40 ppm)
Glutaraldehyde=50 ppm
PAA=20 ppm/Glut=10 ppm
SI=10/50+20/40=0.7

After 5 hours of contact, a 2 $\log_{10}$ drop is achieved with:
PAA>20 ppm (40 ppm)
Glutaraldehyde=20 ppm
PAA=10 ppm/glut=10 ppm
SI=10/40+10/20=0.75

After 24 hours of contact, a 4 $\log_{10}$ drop is achieved with:
PAA>20 ppm (40 ppm)
Glutaraldehyde=20 ppm
PAA=10 ppm/glut=10 ppm
SI=10/40+10/20=0.75

EXAMPLE 2

Synergistic activity of peracetic acid and DBNPA against microorganisms was demonstrated in papermill process water at pH 7.0.

| Biocide (ppm product) | 30 Min. | 90 Min. | 5 Hours | 24 Hours |
|---|---|---|---|---|
| 1. PAA-5 | $7.4 \times 10^5$ | $8.5 \times 10^5$ | $7.8 \times 10^5$ | $8.8 \times 10^6$ |
| 2. PAA-10 | $6.4 \times 10^5$ | $6.7 \times 10^5$ | $5.2 \times 10^5$ | $2.9 \times 10^6$ |
| 3. PAA-20 | $4.0 \times 10^5$ | $5.4 \times 10^5$ | $1.0 \times 10^5$ | $5.1 \times 10^5$ |
|  | 0 min. | 60 min. | 4.5 hr. | 24 hr. |
| 4. DBNPA-100 | $3.9 \times 10^5$ | $<10^1$ | $<10^1$ | $<10^1$ |
| 5. DBNPA-75 | $5.1 \times 10^5$ | $<10^1$ | $<10^1$ | $<10^1$ |
| 6. DBNPA-50 | $6.0 \times 10^5$ | $8.1 \times 10^2$ | $<10^1$ | $<10^1$ |
| 7. DBNPA-25 | $6.0 \times 10^5$ | $3.3 \times 10^3$ | $<10^1$ | $9.4 \times 10^4$ |
| 8. DBNPA-100/PAA-5 | $4.3 \times 10^5$ | $<10^1$ | $<10^1$ | $<10^1$ |
| 9. DBNPA-75/PAA-5 | $6.1 \times 10^5$ | $<10^1$ | $<10^1$ | $<10^1$ |
| 10. DBNPA-50/PAA-5 | $3.7 \times 10^5$ | $<10^1$ | $<10^1$ | $<10^1$ |
| 11. DBNPA-25/PAA-5 | $8.8 \times 10^5$ | $3.4 \times 10^3$ | $1.1 \times 10^2$ | $<10^1$ |
| 12. DBNPA-100/PAA-10 | $5.5 \times 10^5$ | $<10^1$ | $<10^1$ | $<10^1$ |
| 13. DBNPA-75/PAA-10 | $1.4 \times 10^5$ | $<10^1$ | $<10^1$ | $<10^1$ |
| 14. DBNPA-50/PAA-10 | $9.5 \times 10^4$ | $<10^1$ | $<10^1$ | $<10^1$ |
| 15. DBNPA-25/PAA-10 | $3.6 \times 10^4$ | $<10^1$ | $<10^1$ | $<10^1$ |
| 16. DBNPA-100/PAA-20 | $2.0 \times 10^5$ | $<10^1$ | $<10^1$ | $<10^1$ |
| 17. DBNPA-75/PAA-20 | $5.4 \times 10^5$ | $<10^1$ | $<10^1$ | $<10^1$ |
| 18. DBNPA-50/PAA-20 | $4.5 \times 10^5$ | $<10^1$ | $<10^1$ | $<10^1$ |
| 19. DBNPA-25/PAA-20 | $3.7 \times 10^5$ | $<10^1$ | $<10^1$ | $<10^1$ |
| 20. Control-0 | $3.7 \times 10^5$ | $9.0 \times 10^5$ | $3.0 \times 10^5$ | $2.4 \times 10^6$ |

After 90 minutes of contact, a 5 $\log_{10}$ drop is achieved with:
PAA>20 ppm (40 ppm)
DBNPA=75 ppm
PAA=5 ppm/DBNPA=50 ppm
SI=5/40+25/50=0.79
PAA=10 ppm/DBNPA=25 ppm
SI=10/40+25/75=0.58

After 24 hours of contact, a 5 $\log_{10}$ drop is achieved with:
PAA>20 ppm (40 ppm)
DBNPA=50 ppm
PAA=5 ppm/DBNPA=25 ppm
SI=5/40+25/50=0.625

EXAMPLE 3

Synergistic activity of peracetic acid and methylene bisthiocyanate (MBT) against microorganisms was demonstrated in mill furnish at pit 7.1.

| Biocide (ppm product) | 30 Min. | 2 Hours | 5 Hours | 24 Hours |
|---|---|---|---|---|
| 1. PAA-25 | $2.2 \times 10^6$ | $1.4 \times 10^6$ | $2.9 \times 10^6$ | $7.3 \times 10^6$ |
| 2. PAA-50 | $2.9 \times 10^4$ | $7.5 \times 10^4$ | $2.1 \times 10^4$ | $1.8 \times 10^6$ |
| 3. PAA-100 | $6.8 \times 10^2$ | $6.1 \times 10^2$ | $5.9 \times 10^2$ | $2.4 \times 10^6$ |
|  | 0 Min. | 1.5 Hrs. | 4.5 Hrs. | 24 Hrs. |
| 4. MBT-5 |  | $9.8 \times 10^6$ | $7.1 \times 10^6$ | $1.6 \times 10^6$ |
| 5. MBT-10 |  | $3.6 \times 10^6$ | $5.7 \times 10^6$ | $3.8 \times 10^6$ |
| 6. MBT-25 |  | $2.4 \times 10^6$ | $8.0 \times 10^5$ | $7.5 \times 10^6$ |
| 7. MBT-50 | $2.2 \times 10^6$ | $2.1 \times 10^6$ | $2.1 \times 10^5$ | $3.4 \times 10^5$ |

-continued

| Biocide (ppm product) | 30 Min. | 2 Hours | 5 Hours | 24 Hours |
|---|---|---|---|---|
| 8. PAA-10/MBT-5 | | $3.8 \times 10^6$ | $7.7 \times 10^6$ | $4.6 \times 10^7$ |
| 9. PAA-10/MBT-10 | | $4.3 \times 10^6$ | $5.2 \times 10^6$ | $4.5 \times 10^7$ |
| 10. PAA-10/MBT-25 | | $1.9 \times 10^6$ | $2.6 \times 10^6$ | $1.1 \times 10^7$ |
| 11. PAA-10/MBT-50 | $3.8 \times 10^6$ | $1.7 \times 10^6$ | $3.4 \times 10^3$ | $7.7 \times 10^4$ |
| 12. PAA-20/MBT-5 | | $1.4 \times 10^6$ | $2.1 \times 10^6$ | $1.8 \times 10^7$ |
| 13. PAA-20/MBT-10 | | $1.9 \times 10^6$ | $1.1 \times 10^6$ | $1.6 \times 10^7$ |
| 14. PAA-20/MBT-25 | | $1.1 \times 10^5$ | $4.6 \times 10^5$ | $3.3 \times 10^6$ |
| 15. PAA-20/MBT-50 | $1.7 \times 10^6$ | $6.0 \times 10^5$ | $6.3 \times 10^4$ | $2.4 \times 10^3$ |
| 16. PAA-40/MBT-5 | | $8.2 \times 10^4$ | $2.8 \times 10^4$ | $1.2 \times 10^7$ |
| 17. PAA-40/MBT-10 | | $9.2 \times 10^4$ | $2.5 \times 10^4$ | $1.3 \times 10^7$ |
| 18. PAA-40/MBT-25 | | $6.3 \times 10^4$ | $1.6 \times 10^4$ | $4.0 \times 10^5$ |
| 19. PAA-40/MBT-50 | $1.4 \times 10^5$ | $4.9 \times 10^4$ | $2.2 \times 10^4$ | $1.8 \times 10^3$ |
| 20. Control-0 | $1.1 \times 10^7$ | $1.5 \times 10^7$ | $3.1 \times 10^7$ | $7.5 \times 10^6$ |

After 24 hours of contact, a 3 $\log_{10}$ drop is achieved with:
PAA>100 ppm (200 ppm)
MBT>50 ppm (100 ppm)
PAA=20 ppm/MBT=50 ppm
SI=20/200+50/100=0.6
After 5 hours of contact, a 3 $\log_{10}$ drop is achieved with:
PAA=50 ppm
MBT>50 ppm (100 ppm)
PAA=20 ppm/MBT=50 ppm
SI=20/50+50/100=0.9

EXAMPLE 4

Synergistic activity of peracetic acid and carbamate (CARB) against microorganisms was demonstrated in mill furnish at pH 7.28.

| Biocide (ppm product) | 30 Min. | 2 Hours | 5 Hours | 24 Hours |
|---|---|---|---|---|
| 1. PAA-25 | $1.3 \times 10^5$ | $2.4 \times 10^5$ | $1.8 \times 10^6$ | $3.0 \times 10^7$ |
| 2. PAA-50 | $1.6 \times 10^3$ | $2.5 \times 10^3$ | $1.0 \times 10^4$ | $1.7 \times 10^7$ |
| 3. PAA-100 | $1.3 \times 10^2$ | $1.5 \times 10^3$ | $1.5 \times 10^3$ | $8.1 \times 10^6$ |
| | 0 Min. | 1.5 Hr. | 4.5 Hr. | 24 Hr. |
| 4. CARB-50 | | $9.8 \times 10^6$ | $1.1 \times 10^7$ | $2.6 \times 10^6$ |
| 5. CARB-100 | | $9.4 \times 10^6$ | $7.2 \times 10^6$ | $7.8 \times 10^4$ |
| 6. CARB-150 | | $1.1 \times 10^6$ | $1.0 \times 10^6$ | $3.8 \times 10^4$ |
| 7. CARB-200 | $4.7 \times 10^6$ | $1.8 \times 10^6$ | $1.0 \times 10^6$ | $3.0 \times 10^4$ |
| 8. PAA-10/CARB-50 | | $2.8 \times 10^6$ | $2.5 \times 10^6$ | $2.8 \times 10^4$ |
| 9. PAA-10/CARB-100 | | $3.2 \times 10^6$ | $5.0 \times 10^4$ | $4.0 \times 10^4$ |
| 10. PAA-10/CARB-150 | | $3.0 \times 10^6$ | $2.6 \times 10^4$ | $4.8 \times 10^4$ |
| 11. PAA-10/CARB-200 | $2.2 \times 10^6$ | $1.4 \times 10^5$ | $5.9 \times 10^4$ | $2.5 \times 10^3$ |
| 12. PAA-20/CARB-50 | | $1.1 \times 10^5$ | $2.0 \times 10^6$ | $2.1 \times 10^3$ |
| 13. PAA-20/CARB-100 | | $3.9 \times 10^4$ | $4.5 \times 10^4$ | $1.2 \times 10^3$ |
| 14. PAA-20/CARB-150 | | $2.3 \times 10^4$ | $2.5 \times 10^4$ | $1.5 \times 10^3$ |
| 15. PAA-20/CARB-200 | $3.7 \times 10^5$ | $2.5 \times 10^4$ | $1.9 \times 10^4$ | $8.1 \times 10^2$ |
| 16. PAA-40/CARB-50 | | $2.3 \times 10^3$ | $1.2 \times 10^3$ | $9.3 \times 10^2$ |
| 17. PAA-40/CARB-100 | | $2.0 \times 10^3$ | $7.0 \times 10^2$ | $5.4 \times 10^2$ |
| 18. PAA-40/CARB-150 | | $1.4 \times 10^3$ | $6.6 \times 10^2$ | $6.8 \times 10^2$ |
| 19. PAA-40/CARB-200 | $1.0 \times 10^4$ | $1.3 \times 10^3$ | $5.6 \times 10^2$ | $6.0 \times 10^2$ |
| 20. Control-0 | $1.2 \times 10^7$ | $3.0 \times 10^6$ | $3.0 \times 10^6$ | $3.2 \times 10^7$ |

After 2 hours of contact, a 2 $\log_{10}$ drop was achieved with:
PAA=50 ppm
CARB>200 ppm (400 ppm)
PAA=20 ppm/CARB=100 ppm
SI=20/50+100/400=0.65
PAA=40 ppm/CARB<50 ppm
SI=40/50+25/400=0.8625
After 5 hours of contact, a 4 $\log_{10}$ drop was achieved with:
PAA>100 ppm (200 ppm)
CARB>200 ppm (400 ppm)
PAA=40 ppm/CARB=100 ppm
SI=40/200+100/400=0.45
After 24 hours of contact, a 4 $\log_{10}$ drop was achieved with:
PAA>100 ppm (200 ppm)
CARB>200 ppm (400 ppm)
PAA=10 ppm/CARB=200 ppm
SI=10/200+200/400=0.55
PAA=20 ppm/CARB=50 ppm
SI=20/200+50/400=0.225
PAA=40 ppm/CARB=50 ppm
SI=40/200+50/400=0.325

EXAMPLE 5

Synergistic activity of peracetic acid and a quaternary ammonium compound against microorganisms was demonstrated in mill finish at pH 7.28.

| Biocide (ppm product) | 30 Min. | 3 Hours | 5 Hours | 24 Hours |
|---|---|---|---|---|
| 1. PAA-25 | $4.2 \times 10^6$ | $5.4 \times 10^6$ | $5.3 \times 10^6$ | $1.7 \times 10^7$ |
| 2. PAA-50 | $4.4 \times 10^4$ | $1.1 \times 10^5$ | $7.3 \times 10^4$ | $1.9 \times 10^7$ |
| 3. PAA-100 | $8.0 \times 10^2$ | $1.1 \times 10^3$ | $1.1 \times 10^3$ | $1.3 \times 10^7$ |
| | 0 Min. | 2.5 Hr. | 4.5 Hr. | 24 Hr. |
| 4. QUAT-25 | | $2.7 \times 10^5$ | $3.0 \times 10^5$ | $1.8 \times 10^7$ |
| 5. QUAT-50 | | $1.0 \times 10^5$ | $1.7 \times 10^5$ | $1.1 \times 10^7$ |
| 6. QUAT-100 | | $7.9 \times 10^4$ | $8.6 \times 10^4$ | $5.2 \times 10^6$ |
| 7. QUAT-200 | $7.5 \times 10^4$ | $6.4 \times 10^2$ | $7.2 \times 10^2$ | $1.6 \times 10^2$ |
| 8. PAA-10/QUAT-25 | | $1.2 \times 10^5$ | $2.0 \times 10^5$ | $1.7 \times 10^7$ |
| 9. PAA-10/QUAT-50 | | $6.6 \times 10^4$ | $1.3 \times 10^5$ | $7.3 \times 10^6$ |
| 10. PAA-10/QUAT-100 | | $1.3 \times 10^3$ | $3.1 \times 10^3$ | $1.6 \times 10^7$ |
| 11. PAA-10/QUAT-200 | $1.7 \times 10^5$ | $5.0 \times 10^2$ | $6.8 \times 10^2$ | $2.9 \times 10^6$ |
| 12. PAA-20/QUAT-25 | | $1.8 \times 10^5$ | $1.2 \times 10^5$ | $4.9 \times 10^6$ |
| 13. PAA-20/QUAT-50 | | $9.1 \times 10^4$ | $1.2 \times 10^5$ | $6.5 \times 10^6$ |
| 14. PAA-20/QUAT-100 | | $3.9 \times 10^3$ | $6.8 \times 10^3$ | $5.0 \times 10^6$ |
| 15. PAA-20/QUAT-200 | $6.3 \times 10^4$ | $5.4 \times 10^2$ | $6.6 \times 10^2$ | $2.4 \times 10^2$ |
| 16. PAA-40/QUAT-25 | | $3.4 \times 10^3$ | $4.0 \times 10^3$ | $8.9 \times 10^6$ |
| 17. PAA-40/QUAT-50 | | $1.9 \times 10^3$ | $1.7 \times 10^3$ | $3.0 \times 10^5$ |
| 18. PAA-40/QUAT-100 | | $2.0 \times 10^3$ | $1.7 \times 10^3$ | $4.0 \times 10^5$ |
| 19. PAA-40/QUAT-200 | $1.3 \times 10^3$ | $3.7 \times 10^2$ | $5.3 \times 10^2$ | $1.9 \times 10^2$ |
| 20. Control-0 | $1.1 \times 10^7$ | $1.4 \times 10^7$ | $1.3 \times 10^7$ | $2.1 \times 10^7$ |

After 24 hours of contact, a 2 $\log_{10}$ drop was achieved with:
PAA>100 ppm (200 ppm)
QUAT=200 ppm
PAA=40 ppm/QUAT=50 ppm
SI=40/200+50/200=0.45
After 3 hours & 5 hours of contact, a 4 $\log_{10}$ drop was achieved with:
PAA=100 ppm
QUAT=200 ppm PAA=40 ppm/QUAT=25 ppm
SI=40/100+25/200=0.525

EXAMPLE 6

Synergistic activity of peracetic acid and isothiazolin (ISO) against microorganisms was demonstrated in mill furnish at pH 7.5.

| Biocide (ppm product) | 30 Min. | 90 Min. | 5 Hours | 24 Hours |
|---|---|---|---|---|
| 1. PAA-10 | $4.9 \times 10^5$ | $5.0 \times 10^5$ | $2.5 \times 10^6$ | $9.6 \times 10^6$ |
| 2. PAA-25 | $2.9 \times 10^5$ | $4.8 \times 10^5$ | $4.2 \times 10^6$ | $2.3 \times 10^6$ |
| 3. PAA-50 | $6.3 \times 10^4$ | $1.8 \times 10^5$ | $4.1 \times 10^5$ | $2.5 \times 10^7$ |
| | 0 Min. | 60 Min. | 4.5 Hr. | 24 Hr. |
| 4. ISO-133 | $7.4 \times 10^5$ | $5.1 \times 10^5$ | $4.7 \times 10^5$ | $1.6 \times 10^4$ |
| 5. ISO-100 | $7.3 \times 10^5$ | $5.6 \times 10^5$ | $4.2 \times 10^5$ | $1.9 \times 10^4$ |
| 6. ISO-67 | $7.8 \times 10^5$ | $5.9 \times 10^5$ | $3.8 \times 10^5$ | $9.6 \times 10^4$ |
| 7. ISO-33 | $8.0 \times 10^5$ | $5.7 \times 10^5$ | $6.1 \times 10^5$ | $2.2 \times 10^7$ |
| 8. PAA-10/ISO-133 | $5.2 \times 10^5$ | $1.6 \times 10^5$ | $2.1 \times 10^5$ | $1.1 \times 10^4$ |
| 9. PAA-10/ISO-100 | $3.1 \times 10^5$ | $1.4 \times 10^5$ | $3.4 \times 10^5$ | $2.1 \times 10^4$ |
| 10. PAA-10/ISO-67 | $3.7 \times 10^5$ | $2.1 \times 10^5$ | $4.8 \times 10^5$ | $4.9 \times 10^4$ |
| 11. PAA-10/ISO-33 | $2.6 \times 10^5$ | $2.2 \times 10^5$ | $6.4 \times 10^5$ | $5.3 \times 10^6$ |
| 12. PAA-25/ISO-133 | $1.4 \times 10^5$ | $6.7 \times 10^4$ | $1.1 \times 10^5$ | $3.2 \times 10^3$ |
| 13. PAA-25/ISO-100 | $1.6 \times 10^5$ | $8.7 \times 10^4$ | $1.2 \times 10^5$ | $4.2 \times 10^3$ |
| 14. PAA-25/ISO-67 | $1.2 \times 10^5$ | $8.0 \times 10^4$ | $1.4 \times 10^5$ | $4.9 \times 10^3$ |
| 15. PAA-25/ISO-33 | $1.5 \times 10^5$ | $9.4 \times 10^4$ | $1.6 \times 10^5$ | $9.8 \times 10^5$ |
| 16. PAA-50/ISO-133 | $1.8 \times 10^4$ | $5.5 \times 10^3$ | $5.3 \times 10^3$ | $1.6 \times 10^2$ |
| 17. PAA-50/ISO-100 | $1.4 \times 10^4$ | $6.8 \times 10^3$ | $3.5 \times 10^4$ | $3.2 \times 10^2$ |
| 18. PAA-50/ISO-67 | $3.3 \times 10^4$ | $1.2 \times 10^4$ | $3.3 \times 10^4$ | $1.1 \times 10^3$ |
| 19. PAA-50/ISO-33 | $1.9 \times 10^4$ | $2.3 \times 10^4$ | $5.1 \times 10^4$ | $5.4 \times 10^3$ |
| 20. Control-0 | $8.2 \times 10^5$ | $7.1 \times 10^5$ | $2.5 \times 10^6$ | $4.3 \times 10^6$ |

After 90 minutes of contact, a 1 $\log_{10}$ drop was achieved with:

PAA>50 ppm (100 ppm)

ISO>133 ppm (167 ppm)

PAA=25 ppm/ISO=67 ppm

SI=25/100+67/167=0.65

After 5 hours of contact, a 2 $\log_{10}$ drop was achieved with:

PAA>50 ppm (100 ppm)

ISO>133 ppm (167 ppm)

PAA=50 ppm/ISO=33 ppm

SI=50/100+33/167=0.70

After 24 hours of contact, a 3 $\log_{10}$ drop was achieved with:

PAA>50 ppm (100 ppm)

ISO>133 ppm (167 ppm)

PAA=25 ppm/ISO=67 ppm

SI=25/100+67/167=0.65

The FIGURE of the specification illustrates comparative results of utilizing peracetic acid or a biocide alone as compared with a combination of the two together. Graphing colony forming units ("CCFU") versus hours demonstrates the effectiveness of the administered chemicals.

EXAMPLE 7

Trials were conducted at a paper mill where inadequate antimicrobial control was being applied and slime began to develop on machine surfaces. The aerobic bacterial population on the machine surfaces was found to persist at $1 \times 10^7$ CFU/mL. At counts higher than this, the mill experiences sever slime problems and the quality of paper being produced is compromised.

If a 1.5% isothiazolin blend is fed to this machine as a sole biocide, 150 ppm of the 1.5% isothiazolin blend is needed to hold the population to $5 \times 10^6$ CFU/mL. However, over an extended period of time, even this high dosage becomes inadequate. A combination of 10 ppm of a 4.5% peracetic acid solution and 17 ppm of the 1.5% isothiazolin blend allowed the counts to increase to the level of $1 \times 10^7$ CFU/mL. By increasing the 1.5% isothiazolin blend to 33 ppm, the population dropped to $1 \times 10^4$ CFU/mL.

Laboratory testing has shown that a 50 ppm dose of the 4.5% peracetic acid solution is needed to drop the population to $10^4$ CFU/mL by itself. Using this information, a synergy index can be calculated.

To achieve a 3 log drop:
 alone 4.5% peracetic acid solution=50 ppm
 alone 1.5% isothiazolin blend>150 ppm (200 ppm) or
 Combination of 10 ppm 4.5% peracetic acid solution+ 33 ppm of N-7647

Synergy Index
 10/50+33/200=0.365

The 4.5% peracetic acid solution was being fed continuously to the whitewater loop and the 1.5% isothiazolin blend was being fed intermittently to the same application point. On an actives basis, when the 1.5% isothiazolin blend was being added, this ratio is very close to 1:1. This range will vary, mill to mill, anywhere from 5:1 to 1:5 for this combination. Based on the laboratory data, ratios for other biocide combinations would be expected to range from 1:1 to 1:200, on an actives basis.

The present invention lowers the levels of expensive chemicals needed for inhibiting the growth of microorganisms. As illustrated in the figure, a 100 ppm dosage of biocide, such as carbamate, in combination with 20 ppm dosage of peracetic acid is more effective than administering either 25 ppm of peracetic acid or 200 ppm of the biocide alone. Accordingly, the present invention provides a more cost effective and environmentally friendly method for treating microorganisms.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims:

I claim:

1. a method for controlling the growth of microorganisms in pulp and paper mill process water including the step of administering a sufficient amount of a peracetic acid and a sufficient amount of a second organic biocide to the process water to reduce the growth of the microorganisms; said biocide being selected from the group consisting of isothizolin; methylene bisthiocyanate; DBNPA; carbamate; quaternary ammonium compounds; bronopol; 4,5 -dichloro-1,2-dithio-3-one; and 4,5-dichloro-2-N-octyl-4 -isothiazolin-3-one said amount of peracetic acid and biocide being selected to result in a synergy index of less than 1 wherein said synergy index is calculated by determining a first ratio of the amount of peracetic acid required to produce a level of microorganism growth control when added in combination with the amount of biocide to the amount of peracetic acid required to produce the level of growth control in the absence of the biocide, and adding the first ratio to a second ratio of the amount of biocide required to produce the level of growth control when added in combination with the amount of peracetic acid to the amount of oxidizing biocide required to produce the level of growth control in the absence of the peracetic acid.

2. The method of claim 1 wherein the peracetic acid and the second organic biocide are added in a ratio from about 10:1 to 1:25.

3. The method of claim 1 wherein the amount of peracetic acid added ranges from approximately 5 to 250 ppm and the second organic biocide ranges from approximately 10 to 250 ppm.

4. The method of claim 1 wherein the microorganisms contain bacteria.

5. The method of claim 1 wherein the microorganisms contain fungi.

6. The method of claim 1 wherein the peracetic acid is added to the process water prior to the addition of the second organic biocide. .

* * * * *